(12) United States Patent
Geppert et al.

(10) Patent No.: US 7,406,413 B2
(45) Date of Patent: Jul. 29, 2008

(54) METHOD AND SYSTEM FOR THE PROCESSING OF VOICE DATA AND FOR THE RECOGNITION OF A LANGUAGE

(75) Inventors: Nicolas Andre Geppert, St. Leon-Rot (DE); Jürgen Sattler, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 953 days.

(21) Appl. No.: 10/430,403

(22) Filed: May 7, 2003

(65) Prior Publication Data

US 2004/0073424 A1   Apr. 15, 2004

(30) Foreign Application Priority Data

May 8, 2002   (DE) ................. 102 20 524

(51) Int. Cl.
G10L 21/06   (2006.01)
(52) U.S. Cl. .................................... 704/235; 379/88.01
(58) Field of Classification Search ..................... 704/2, 704/235; 379/88.01
See application file for complete search history.

(56) References Cited

U.S. PATENT DOCUMENTS

| | | | |
|---|---|---|---|
| 4,015,087 A | 3/1977 | Stewart | |
| 4,181,813 A | 1/1980 | Marley | |
| 4,284,846 A | 8/1981 | Marley | |
| 4,335,277 A | 6/1982 | Puri | |
| 4,481,593 A | 11/1984 | Bahler | |
| 4,489,435 A | 12/1984 | Moshier | |
| 4,581,757 A | 4/1986 | Cox | |
| 4,672,667 A | 6/1987 | Scott et al. | |
| 4,718,093 A | 1/1988 | Brown | |
| 4,718,095 A | 1/1988 | Asakawa et al. | |
| 4,761,815 A | 8/1988 | Hitchcock | |
| 4,866,755 A | 9/1989 | Hashimoto | |
| 4,947,438 A | 8/1990 | Paeseler | |
| 4,977,598 A | 12/1990 | Doddington et al. | |
| 4,991,217 A | 2/1991 | Garrett et al. | |

(Continued)

FOREIGN PATENT DOCUMENTS

AU          588673 B2     9/1989

(Continued)

OTHER PUBLICATIONS

K. Seymore and R. Rosenfeld, "Using Story Topics for Language Model Adaptation," European Conference on Speech Communication and Technology, Eurospeech '97, Rhodes, Greece, (Sep. 1997), pp. 1987-1990.

(Continued)

*Primary Examiner*—Susan McFadden
(74) *Attorney, Agent, or Firm*—Finnegan, Henderson, Farabow, Garrett & Dunner, L.L.P.

(57) ABSTRACT

Methods and systems are provided for processing voice data from a call between a first human party and a second or more human parties and/or an automated attendant system, or between a first human party and one or more second human parties, wherein the voice data is generated from the call. The language of the first party may be recognized automatically. Further, the voice data from the call may be analyzed either fully or in part by a voice recognition system and converted into text.

66 Claims, 3 Drawing Sheets

U.S. PATENT DOCUMENTS

| | | | |
|---|---|---|---|
| 5,036,538 A | 7/1991 | Oken et al. | |
| 5,036,539 A | 7/1991 | Wrench, Jr. et al. | |
| 5,054,085 A | 10/1991 | Meisel et al. | |
| 5,056,150 A | 10/1991 | Yu et al. | |
| 5,170,432 A | 12/1992 | Hackbarth et al. | |
| 5,197,052 A | 3/1993 | Schroder et al. | |
| 5,228,110 A | 7/1993 | Steinbiss | |
| 5,285,522 A | 2/1994 | Mueller | |
| 5,440,663 A | 8/1995 | Moese et al. | |
| 5,502,790 A | 3/1996 | Yi | |
| 5,528,725 A | 6/1996 | Hui | |
| 5,572,675 A | 11/1996 | Bergler | |
| 5,583,968 A | 12/1996 | Trompf | |
| 5,586,215 A | 12/1996 | Stork et al. | |
| 5,590,242 A | 12/1996 | Juang et al. | |
| 5,613,034 A | 3/1997 | Ney et al. | |
| 5,621,858 A | 4/1997 | Stork et al. | |
| 5,625,748 A | 4/1997 | McDonough et al. | |
| 5,634,083 A | 5/1997 | Oerder | |
| 5,638,425 A | 6/1997 | Meador et al. | |
| 5,655,058 A | 8/1997 | Balasubramanian et al. | |
| 5,657,424 A | 8/1997 | Farrell et al. | |
| 5,661,784 A | 8/1997 | Zinke | |
| 5,680,481 A | 10/1997 | Prasad et al. | |
| 5,687,288 A | 11/1997 | Dobler et al. | |
| 5,689,616 A | 11/1997 | Li | |
| 5,719,997 A | 2/1998 | Brown et al. | |
| 5,737,723 A | 4/1998 | Riley et al. | |
| 5,745,876 A | 4/1998 | Kneser et al. | |
| 5,748,841 A | 5/1998 | Morin et al. | |
| 5,749,066 A | 5/1998 | Nussbaum | |
| 5,754,978 A | 5/1998 | Pérez-Méndez et al. | |
| 5,758,021 A | 5/1998 | Hackbarth | |
| 5,758,022 A | 5/1998 | Trompf et al. | |
| 5,771,306 A | 6/1998 | Stork et al. | |
| 5,797,122 A | 8/1998 | Spies | |
| 5,805,771 A | 9/1998 | Muthusamy et al. | |
| 5,809,462 A | 9/1998 | Nussbaum | |
| 5,832,181 A | 11/1998 | Wang | |
| 5,835,888 A | 11/1998 | Kanevsky et al. | |
| 5,842,163 A | 11/1998 | Weintraub | |
| 5,845,092 A | 12/1998 | Hsieh | |
| 5,848,388 A | 12/1998 | Power et al. | |
| 5,864,803 A | 1/1999 | Nussbaum | |
| 5,864,805 A | 1/1999 | Chen et al. | |
| 5,867,816 A | 2/1999 | Nussbaum | |
| 5,899,971 A | 5/1999 | De Vos | |
| 5,905,773 A | 5/1999 | Wong | |
| 5,946,655 A | 8/1999 | Steinbiss et al. | |
| 5,956,678 A | 9/1999 | Häb-Umbach et al. | |
| 5,963,906 A | 10/1999 | Turin | |
| 5,974,381 A | 10/1999 | Kubota | |
| 5,987,116 A | 11/1999 | Petrunka et al. | |
| 5,987,409 A | 11/1999 | Tran et al. | |
| 5,995,930 A | 11/1999 | Häb-Umbach et al. | |
| 6,041,296 A | 3/2000 | Welling et al. | |
| 6,064,963 A | 5/2000 | Gainsboro | |
| 6,067,513 A | 5/2000 | Ishimitsu | |
| 6,073,097 A | 6/2000 | Gould et al. | |
| 6,081,779 A | 6/2000 | Besling et al. | |
| 6,085,160 A | 7/2000 | D'hoore et al. | |
| 6,094,635 A | 7/2000 | Scholz et al. | |
| 6,100,882 A | 8/2000 | Sharman et al. | |
| 6,101,467 A | 8/2000 | Bartosik | |
| 6,119,084 A | 9/2000 | Roberts et al. | |
| 6,119,086 A | 9/2000 | Ittycheriah et al. | |
| 6,122,613 A | 9/2000 | Baker | |
| 6,138,094 A | 10/2000 | Miet et al. | |
| 6,141,641 A | 10/2000 | Hwang et al. | |
| 6,157,912 A | 12/2000 | Kneser et al. | |
| 6,161,082 A | 12/2000 | Goldberg et al. | |
| 6,173,260 B1 | 1/2001 | Slaney | |
| 6,177,029 B1 | 1/2001 | Kaz et al. | |
| 6,182,045 B1 | 1/2001 | Kredo et al. | |
| 6,185,538 B1 | 2/2001 | Schulz | |
| 6,205,420 B1 | 3/2001 | Takagi et al. | |
| 6,212,500 B1 | 4/2001 | Köhler | |
| 6,230,132 B1 | 5/2001 | Class et al. | |
| 6,230,197 B1 | 5/2001 | Beck et al. | |
| 6,246,986 B1 | 6/2001 | Ammicht et al. | |
| 6,272,461 B1 | 8/2001 | Meredith et al. | |
| 6,278,972 B1 | 8/2001 | Bi et al. | |
| 6,298,323 B1 | 10/2001 | Kaemmerer | |
| 6,314,402 B1 | 11/2001 | Monaco et al. | |
| 6,321,198 B1 | 11/2001 | Hank et al. | |
| 6,327,343 B1 * | 12/2001 | Epstein et al. | 379/88.01 |
| 6,327,347 B1 | 12/2001 | Gutzmann | |
| 6,339,759 B1 | 1/2002 | Aubert et al. | |
| 6,345,250 B1 | 2/2002 | Martin | |
| 6,363,346 B1 | 3/2002 | Walters | |
| 6,363,348 B1 | 3/2002 | Besling et al. | |
| 6,366,879 B1 | 4/2002 | Coxhead et al. | |
| 6,393,395 B1 | 5/2002 | Guha et al. | |
| 6,411,687 B1 | 6/2002 | Bohacek et al. | |
| 6,434,524 B1 | 8/2002 | Weber | |
| 6,460,017 B1 | 10/2002 | Bub et al. | |
| 6,499,013 B1 | 12/2002 | Weber | |
| 6,510,414 B1 * | 1/2003 | Chaves | 704/270 |
| 6,513,037 B1 | 1/2003 | Rüber et al. | |
| 6,526,380 B1 | 2/2003 | Thelen et al. | |
| 6,532,444 B1 | 3/2003 | Weber | |
| 6,651,042 B1 * | 11/2003 | Field et al. | 704/270 |
| 6,675,142 B2 | 1/2004 | Ortega et al. | |
| 6,704,708 B1 | 3/2004 | Pickering | |
| 6,816,468 B1 | 11/2004 | Cruickshank | |
| 6,823,054 B1 | 11/2004 | Suhm et al. | |
| 6,850,609 B1 | 2/2005 | Schrage | |
| 6,895,083 B1 | 5/2005 | Bers et al. | |
| 6,970,554 B1 | 11/2005 | Peterson et al. | |
| 7,016,849 B2 * | 3/2006 | Arnold et al. | 704/275 |
| 7,092,888 B1 * | 8/2006 | McCarthy et al. | 704/277 |
| 2001/0011217 A1 | 8/2001 | Ammicht et al. | |
| 2001/0013001 A1 | 8/2001 | Brown et al. | |
| 2002/0013706 A1 | 1/2002 | Profio | |
| 2002/0042713 A1 | 4/2002 | Kim et al. | |
| 2002/0046150 A1 | 4/2002 | Haehle | |
| 2002/0065651 A1 | 5/2002 | Kellner et al. | |
| 2002/0107690 A1 | 8/2002 | Souvignier | |
| 2002/0128833 A1 | 9/2002 | Steinbiss | |
| 2002/0150246 A1 | 10/2002 | Ogino | |
| 2002/0161572 A1 | 10/2002 | Kusumoto | |
| 2003/0014255 A1 | 1/2003 | Steingrubner et al. | |
| 2003/0088403 A1 | 5/2003 | Chan et al. | |
| 2003/0093272 A1 | 5/2003 | Soufflet et al. | |
| 2003/0144837 A1 | 7/2003 | Basson et al. | |
| 2003/0198321 A1 | 10/2003 | Polcyn | |

FOREIGN PATENT DOCUMENTS

| | | |
|---|---|---|
| AU | 658635 B2 | 4/1995 |
| CA | 2 234 504 | 5/1996 |
| CA | 2 319 995 | 4/2001 |
| DE | 29 18 533 | 11/1979 |
| DE | 29 18 533 C2 | 11/1979 |
| DE | 30 17 517 C2 | 11/1980 |
| DE | 32 36 832 C2 | 10/1983 |
| DE | 32 36 834 C2 | 10/1983 |
| DE | 36 08 497 C2 | 9/1987 |
| DE | 36 43 838 A1 | 6/1988 |
| DE | 39 27 234 A1 | 2/1991 |
| DE | 39 30 889 A1 | 3/1991 |
| DE | 41 06 347 A1 | 9/1992 |
| DE | 41 11 781 A1 | 10/1992 |
| DE | 39 31 638 A1 | 12/1992 |

| | | | | | | |
|---|---|---|---|---|---|---|
| DE | 41 20 308 | A1 | 12/1992 | DE | 100 00 819 A1 | 11/2000 |
| DE | 41 30 631 | A1 | 3/1993 | DE | 199 21 832 A1 | 11/2000 |
| DE | 41 30 632 | A1 | 3/1993 | DE | 199 26 740 A1 | 12/2000 |
| DE | 41 30 633 | A1 | 3/1993 | DE | 199 27 317 A1 | 12/2000 |
| DE | 42 43 181 | C2 | 7/1993 | DE | 199 42 178 C1 | 1/2001 |
| DE | 43 01 224 | A1 | 7/1993 | DE | 199 56 747 C1 | 1/2001 |
| DE | 42 12 907 | A1 | 10/1993 | DE | 200 12 141 U1 | 1/2001 |
| DE | 38 83 117 | T2 | 3/1994 | DE | 199 38 535 A1 | 2/2001 |
| DE | 42 40 978 | A1 | 6/1994 | DE | 199 42 871 A1 | 3/2001 |
| DE | 43 06 508 | A1 | 9/1994 | DE | 42 22 916 C2 | 4/2001 |
| DE | 43 09 985 | A1 | 10/1994 | DE | 199 48 308 C2 | 4/2001 |
| DE | 43 22 372 | A1 | 1/1995 | DE | 199 49 560 A1 | 4/2001 |
| DE | 43 25 096 | A1 | 2/1995 | DE | 198 24 450 C2 | 5/2001 |
| DE | 44 36 692 | C2 | 4/1995 | DE | 199 52 769 A1 | 5/2001 |
| DE | 44 01 518 | A1 | 7/1995 | DE | 199 53 813 A1 | 5/2001 |
| DE | 44 07 833 | A1 | 9/1995 | DE | 199 53 875 A1 | 5/2001 |
| DE | 44 08 086 | A1 | 9/1995 | DE | 200 16 333 U1 | 5/2001 |
| DE | 44 12 930 | | 10/1995 | DE | 199 63 142 A1 | 6/2001 |
| DE | 44 12 930 | A1 | 10/1995 | DE | 195 32 114 C2 | 7/2001 |
| DE | 41 06 405 | C2 | 2/1996 | DE | 100 06 725 A1 | 8/2001 |
| DE | 44 38 185 | A1 | 3/1996 | DE | 100 03 779 A1 | 9/2001 |
| DE | 195 08 137 | A1 | 9/1996 | DE | 100 22 700 A1 | 11/2001 |
| DE | 195 10 083 | C2 | 9/1996 | DE | 100 23 359 A1 | 11/2001 |
| DE | 195 14 849 | A1 | 10/1996 | DE | 100 23 780 A1 | 12/2001 |
| DE | 44 12 745 | A1 | 11/1996 | DE | 100 34 236 C1 | 12/2001 |
| DE | 195 16 099 | A1 | 11/1996 | DE | 101 00 725 C1 | 1/2002 |
| DE | 195 32 114 | C2 | 3/1997 | DE | 100 43 531 A1 | 3/2002 |
| DE | 41 06 346 | C2 | 4/1997 | DE | 100 46 359 A1 | 3/2002 |
| DE | 195 81 667 | C2 | 5/1997 | DE | 198 54 420 C2 | 3/2002 |
| DE | 195 81 667 | T1 | 5/1997 | DE | 200 22 756 U1 | 4/2002 |
| DE | 196 10 848 | A1 | 9/1997 | EP | 0 054 365 B1 | 6/1982 |
| DE | 197 21 198 | C2 | 12/1997 | EP | 0 065 829 B1 | 12/1982 |
| DE | 196 24 987 | A1 | 1/1998 | EP | 0 077 194 B1 | 4/1983 |
| DE | 196 24 988 | A1 | 1/1998 | EP | 0 108 354 A2 | 5/1984 |
| DE | 196 30 109 | A1 | 1/1998 | EP | 0 109 179 B1 | 5/1984 |
| DE | 197 19 381 | C1 | 1/1998 | EP | 0 139 642 B1 | 5/1985 |
| DE | 196 36 452 | A1 | 3/1998 | EP | 0 175 503 A1 | 3/1986 |
| DE | 197 09 518 | C1 | 3/1998 | EP | 0 191 354 B1 | 8/1986 |
| DE | 44 30 164 | C2 | 4/1998 | EP | 0 215 573 B1 | 3/1987 |
| DE | 196 39 844 | A1 | 4/1998 | EP | 0 225 735 A1 | 6/1987 |
| DE | 196 40 502 | | 4/1998 | EP | 0 238 693 B1 | 9/1987 |
| DE | 196 40 587 | A1 | 4/1998 | EP | 0 239 016 B1 | 9/1987 |
| DE | 197 05 471 | C2 | 4/1998 | EP | 0 240 679 B1 | 10/1987 |
| DE | 197 07 973 | A1 | 5/1998 | EP | 0 248 593 | 12/1987 |
| DE | 297 23 186 | U1 | 6/1998 | EP | 0 248 593 A1 | 12/1987 |
| DE | 197 03 373 | | 8/1998 | EP | 0 301 199 B1 | 2/1989 |
| DE | 197 03 373 | A1 | 8/1998 | EP | 0 307 137 A2 | 3/1989 |
| DE | 197 08 183 | A1 | 9/1998 | EP | 0 311 022 B1 | 4/1989 |
| DE | 197 08 184 | A1 | 9/1998 | EP | 0 355 748 B1 | 2/1990 |
| DE | 198 15 760 | A1 | 11/1998 | EP | 0 380 297 B1 | 8/1990 |
| DE | 1 974 0119 | | 3/1999 | EP | 0 392 728 B1 | 10/1990 |
| DE | 197 40 119 | A1 | 3/1999 | EP | 0 417 854 A2 | 3/1991 |
| DE | 197 50 856 | A1 | 5/1999 | EP | 0 418 711 B1 | 3/1991 |
| DE | 198 52 002 | B4 | 5/1999 | EP | 0 425 290 B1 | 5/1991 |
| DE | 197 51 123 | C1 | 6/1999 | EP | 0 440 335 A2 | 8/1991 |
| DE | 197 54 383 | A1 | 6/1999 | EP | 0 453 649 B1 | 10/1991 |
| DE | 197 56 512 | A1 | 6/1999 | EP | 0 454 037 B1 | 10/1991 |
| DE | 198 06 941 | A1 | 8/1999 | EP | 0 508 225 A3 | 10/1992 |
| DE | 198 37 102 | A1 | 2/2000 | EP | 0 515 967 B1 | 12/1992 |
| DE | 198 04 047 | C2 | 3/2000 | EP | 0 519 360 A3 | 12/1992 |
| DE | 198 45 560 | A1 | 4/2000 | EP | 0 519 360 B1 | 12/1992 |
| DE | 299 10 274 | U1 | 4/2000 | EP | 519 360 A2 | 12/1992 |
| DE | 198 44 223 | A1 | 5/2000 | EP | 0 543 459 A2 | 5/1993 |
| DE | 198 50 513 | A1 | 5/2000 | EP | 0 590 173 A1 | 4/1994 |
| DE | 198 53 689 | A1 | 5/2000 | EP | 0 595 950 B1 | 5/1994 |
| DE | 198 51 287 | | 6/2000 | EP | 0 614 172 A2 | 9/1994 |
| DE | 198 51 287 | A1 | 6/2000 | EP | 0 618 566 A1 | 10/1994 |
| DE | 198 51 520 | A1 | 6/2000 | EP | 0 623 914 B1 | 11/1994 |
| DE | 198 57 070 | A1 | 6/2000 | EP | 0 633 559 A2 | 1/1995 |
| DE | 199 01 137 | A1 | 7/2000 | EP | 0 642 116 B1 | 3/1995 |
| DE | 199 05 508 | A1 | 7/2000 | EP | 0 664 535 A2 | 7/1995 |
| DE | 199 11 535 | A1 | 9/2000 | EP | 0 671 840 A3 | 9/1995 |
| DE | 100 10 232 | A1 | 10/2000 | EP | 0 674 307 B1 | 9/1995 |

| | | | | | | |
|---|---|---|---|---|---|---|
| EP | 0 676 743 A3 | 10/1995 | | EP | 1 139 332 A2 | 10/2001 |
| EP | 0 676 883 A2 | 10/1995 | | EP | 1 139 335 A2 | 10/2001 |
| EP | 0 677 835 B1 | 10/1995 | | EP | 1 141 939 B1 | 10/2001 |
| EP | 0 677 836 A1 | 10/1995 | | EP | 1 141 941 B1 | 10/2001 |
| EP | 0 681 284 A2 | 11/1995 | | EP | 0 708 960 B1 | 11/2001 |
| EP | 0 708 960 | 5/1996 | | EP | 1 154 625 A3 | 11/2001 |
| EP | 0 713 597 B1 | 5/1996 | | EP | 1 162 602 A1 | 12/2001 |
| EP | 0 716 373 A1 | 6/1996 | | EP | 1 163 661 B1 | 12/2001 |
| EP | 0 722 165 A2 | 7/1996 | | EP | 0 852 051 B1 | 1/2002 |
| EP | 0 731 348 B1 | 9/1996 | | EP | 1 174 857 A1 | 1/2002 |
| EP | 0 743 633 A2 | 11/1996 | | EP | 1 187 440 A2 | 3/2002 |
| EP | 0 746 846 B1 | 12/1996 | | EP | 1 190 413 A2 | 3/2002 |
| EP | 0 770 986 A2 | 5/1997 | | EP | 1 191 517 A2 | 3/2002 |
| EP | 0 797 185 A2 | 9/1997 | | EP | 1 191 772 A2 | 3/2002 |
| EP | 0 798 695 A2 | 10/1997 | | EP | 1 197 951 B1 | 4/2002 |
| EP | 0 806 848 A2 | 11/1997 | | FR | 2 679 690 A1 | 1/1993 |
| EP | 0 814 457 B1 | 12/1997 | | FR | 2 790 586 A1 | 9/2000 |
| EP | 0 821 346 A2 | 1/1998 | | GB | 2 107 100 | 4/1983 |
| EP | 0 834 859 B1 | 4/1998 | | GB | 2 107 101 | 4/1983 |
| EP | 0 834 861 B1 | 4/1998 | | GB | 2 159 997 | 12/1985 |
| EP | 0 844 574 A2 | 5/1998 | | GB | 2 263 042 A | 7/1993 |
| EP | 0 845 774 A2 | 6/1998 | | GB | 2 304 507 | 3/1997 |
| EP | 0 856 832 A1 | 8/1998 | | GB | 2 304 957 A | 3/1997 |
| EP | 0 856 976 | 8/1998 | | GB | 2 343 777 A | 5/2000 |
| EP | 0 856 976 A2 | 8/1998 | | GB | 2 362 745 A | 11/2001 |
| EP | 0 860 772 A1 | 8/1998 | | JP | 59139762 A | 8/1984 |
| EP | 0 862 161 B1 | 9/1998 | | JP | 1013426 | 1/1989 |
| EP | 0 862 162 A2 | 9/1998 | | JP | 01013426 A | 1/1989 |
| EP | 0 865 030 A2 | 9/1998 | | JP | 01177599 A | 7/1989 |
| EP | 0 877 354 B1 | 11/1998 | | JP | 01177600 A | 7/1989 |
| EP | 0 903 728 A2 | 3/1999 | | JP | 01266600 A | 10/1989 |
| EP | 0 910 065 A1 | 4/1999 | | JP | 01298400 A | 12/1989 |
| EP | 0 913 810 A2 | 5/1999 | | JP | 01306898 A | 12/1989 |
| EP | 0 925 579 B1 | 6/1999 | | JP | 01319099 A | 12/1989 |
| EP | 0 954 848 B1 | 11/1999 | | JP | 03230200 A | 10/1991 |
| EP | 0 957 470 | 11/1999 | | JP | 04106895 A | 4/1992 |
| EP | 0 962 914 | 12/1999 | | JP | 04121791 A | 4/1992 |
| EP | 0971 522 A1 | 1/2000 | | JP | 04161998 A | 6/1992 |
| EP | 0 991 990 | 4/2000 | | JP | 04184397 A | 7/1992 |
| EP | 0 992 980 A2 | 4/2000 | | JP | 05073094 A | 3/1993 |
| EP | 1 001 406 A1 | 5/2000 | | JP | 05119793 A | 5/1993 |
| EP | 1 005 002 A1 | 5/2000 | | JP | 05127698 A | 5/1993 |
| EP | 1 016 076 B1 | 7/2000 | | JP | 05323989 A | 12/1993 |
| EP | 1 016 078 B1 | 7/2000 | | JP | 06019494 A | 1/1994 |
| EP | 1 031 138 B1 | 8/2000 | | JP | 06095697 A | 4/1994 |
| EP | 1 035 737 A2 | 9/2000 | | JP | 06214595 A | 8/1994 |
| EP | 1 047 046 A2 | 10/2000 | | JP | 07013584 A | 1/1995 |
| EP | 1 050 872 A2 | 11/2000 | | JP | 07311591 A | 11/1995 |
| EP | 1 051 702 B1 | 11/2000 | | JP | 08160984 A | 6/1996 |
| EP | 1 061 459 A2 | 12/2000 | | JP | 08166798 A | 6/1996 |
| EP | 1 061 724 A2 | 12/2000 | | JP | 08202384 A | 8/1996 |
| EP | 1 070 314 B1 | 1/2001 | | JP | 08248974 A | 9/1996 |
| EP | 1 076 329 A2 | 2/2001 | | JP | 08263091 A | 10/1996 |
| EP | 1 079 615 A2 | 2/2001 | | JP | 09090990 A | 4/1997 |
| EP | 1 083 479 A1 | 3/2001 | | JP | 09097096 A | 4/1997 |
| EP | 1 091 347 A2 | 4/2001 | | JP | 09160586 A | 6/1997 |
| EP | 1 091 349 B1 | 4/2001 | | JP | 09281989 A | 10/1997 |
| EP | 1 093 067 A2 | 4/2001 | | JP | 09330019 A | 12/1997 |
| EP | 1 016 077 B1 | 5/2001 | | JP | 10049194 A | 2/1998 |
| EP | 1 097 446 B1 | 5/2001 | | JP | 10049195 A | 2/1998 |
| EP | 1 100 072 A1 | 5/2001 | | JP | 10063288 A | 3/1998 |
| EP | 1 102 241 A1 | 5/2001 | | JP | 10063294 A | 3/1998 |
| EP | 1 107 229 A2 | 6/2001 | | JP | 10069296 A | 3/1998 |
| EP | 1 109 152 A1 | 6/2001 | | JP | 10187181 A | 7/1998 |
| EP | 1 110 205 B1 | 6/2001 | | JP | 10207486 A | 8/1998 |
| EP | 1 110 206 B1 | 6/2001 | | JP | 10214097 A | 8/1998 |
| EP | WO 01/41126 A1 | 6/2001 | | JP | 10254486 A | 9/1998 |
| EP | 1 119 169 A2 | 7/2001 | | JP | 10322450 A | 12/1998 |
| EP | 1 126 436 A2 | 8/2001 | | JP | 11085200 A | 3/1999 |
| EP | 1 131 814 B1 | 9/2001 | | JP | 11265197 A | 9/1999 |
| EP | 1 133 766 B1 | 9/2001 | | JP | 11355445 A | 12/1999 |
| EP | 1 134 727 A2 | 9/2001 | | JP | 2000020085 A | 1/2000 |
| EP | 1 136 983 A1 | 9/2001 | | JP | 2000122686 A | 4/2000 |

| | | |
|---|---|---|
| JP | 2000267692 A | 9/2000 |
| JP | 2000322079 A | 11/2000 |
| JP | 2000347684 A | 12/2000 |
| JP | 2001005482 A | 1/2001 |
| JP | 2001022373 A | 1/2001 |
| JP | 2001075588 A | 3/2001 |
| JP | 2001118068 A | 4/2001 |
| JP | 2001125589 A | 5/2001 |
| JP | 2001197207 A | 7/2001 |
| JP | 2001242880 A | 9/2001 |
| JP | 2001298540 A | 10/2001 |
| JP | 2001313724 A | 11/2001 |
| KR | 2001070583 A | 4/2002 |
| WO | WO 83/03701 | 10/1983 |
| WO | WO 84/03983 A1 | 10/1984 |
| WO | WO 89/04035 A1 | 5/1989 |
| WO | WO 93 02447 | 2/1993 |
| WO | WO 93/02447 | 2/1993 |
| WO | WO 93/05605 A1 | 3/1993 |
| WO | WO 95/05655 | 2/1995 |
| WO | WO 95/09416 A1 | 4/1995 |
| WO | WO 95/34064 A1 | 12/1995 |
| WO | WO 96/37069 A1 | 11/1996 |
| WO | WO 96/37881 A1 | 11/1996 |
| WO | WO 97/10583 | 3/1997 |
| WO | WO 97 14139 | 4/1997 |
| WO | WO 97/21204 A1 | 6/1997 |
| WO | WO 97/37481 A1 | 10/1997 |
| WO | WO 98/11534 | 3/1998 |
| WO | WO 98/31007 A1 | 7/1998 |
| WO | WO 98/34217 | 8/1998 |
| WO | WO 98/41976 | 9/1998 |
| WO | WO 98/56151 A1 | 12/1998 |
| WO | WO 99/00719 | 1/1999 |
| WO | WO 99/03092 A1 | 1/1999 |
| WO | WO 99/13517 | 3/1999 |
| WO | WO 99/14740 A1 | 3/1999 |
| WO | WO 99/14743 A1 | 3/1999 |
| WO | WO 99/22364 A1 | 5/1999 |
| WO | WO 99 26232 | 5/1999 |
| WO | WO 99/36862 A1 | 7/1999 |
| WO | WO 99 40570 | 8/1999 |
| WO | WO 99/49630 | 9/1999 |
| WO | WO 99/50829 A1 | 10/1999 |
| WO | WO 99 53477 | 10/1999 |
| WO | WO 99/53478 A1 | 10/1999 |
| WO | WO 99/57714 A1 | 11/1999 |
| WO | WO 00/14727 | 3/2000 |
| WO | WO 00/14728 | 3/2000 |
| WO | WO 00/19410 | 4/2000 |
| WO | WO 00/28527 | 5/2000 |
| WO | WO 00/30072 A1 | 5/2000 |
| WO | WO 00/30287 A1 | 5/2000 |
| WO | WO 00/31725 | 6/2000 |
| WO | WO 00/36591 A1 | 6/2000 |
| WO | WO 00/41164 A1 | 7/2000 |
| WO | WO 00/41166 A1 | 7/2000 |
| WO | WO 00/45575 A1 | 8/2000 |
| WO | WO 00/48171 | 8/2000 |
| WO | WO 00/51107 | 8/2000 |
| WO | WO 00 54180 | 9/2000 |
| WO | WO 00/54241 | 9/2000 |
| WO | WO 00/55843 | 9/2000 |
| WO | WO 00/46794 | 10/2000 |
| WO | WO 00/58943 | 10/2000 |
| WO | WO 00/58943 A1 | 10/2000 |
| WO | WO 00/58944 | 10/2000 |
| WO | WO 00/58944 A1 | 10/2000 |
| WO | WO 00/65814 A1 | 11/2000 |
| WO | WO 00 70603 | 11/2000 |
| WO | WO 00/70603 | 11/2000 |
| WO | WO 00/74033 | 12/2000 |
| WO | WO 00/74034 A1 | 12/2000 |
| WO | WO 00 77773 A1 | 12/2000 |
| WO | WO 00/78023 A1 | 12/2000 |
| WO | WO 01/01360 | 1/2001 |
| WO | WO 01 01360 A1 | 1/2001 |
| WO | WO 01 01389 A2 | 1/2001 |
| WO | WO 01 13215 A1 | 2/2001 |
| WO | WO 01 13362 A1 | 2/2001 |
| WO | WO 01/13362 A1 | 2/2001 |
| WO | WO 01/13363 A1 | 2/2001 |
| WO | WO 01/15140 A1 | 3/2001 |
| WO | WO 01/18792 A1 | 3/2001 |
| WO | WO 01/24162 A1 | 4/2001 |
| WO | WO 01/26093 A1 | 4/2001 |
| WO | WO 01/33414 A2 | 5/2001 |
| WO | WO 01/35391 | 5/2001 |
| WO | WO 01/35392 A1 | 5/2001 |
| WO | WO 01/37186 A1 | 5/2001 |
| WO | WO 01/37261 A1 | 5/2001 |
| WO | WO 01/39176 A2 | 5/2001 |
| WO | WO 01/41126 | 6/2001 |
| WO | WO 01/45086 A2 | 6/2001 |
| WO | WO 01/50453 A2 | 7/2001 |
| WO | WO 01/50454 A1 | 7/2001 |
| WO | WO 01/52239 | 7/2001 |
| WO | WO 01/56019 A1 | 8/2001 |
| WO | WO 01/61435 | 8/2001 |
| WO | WO 01 67438 A1 | 9/2001 |
| WO | WO 01/67438 A1 | 9/2001 |
| WO | WO 01/69592 A1 | 9/2001 |
| WO | WO 01/73750 | 10/2001 |
| WO | WO 01/74036 | 10/2001 |
| WO | WO 01/75862 | 10/2001 |
| WO | WO 01 91107 A1 | 11/2001 |
| WO | WO 01/91107 A1 | 11/2001 |
| WO | WO 01/91109 A1 | 11/2001 |
| WO | WO 01/95312 | 12/2001 |
| WO | WO 02/01351 | 1/2002 |
| WO | WO 02/01849 A1 | 1/2002 |
| WO | WO 02 05263 A1 | 1/2002 |
| WO | WO 02 06952 A1 | 1/2002 |
| WO | WO 02/07145 | 1/2002 |
| WO | WO 02/09094 A1 | 1/2002 |
| WO | WO 02/13184 A1 | 2/2002 |
| WO | WO 02/21510 | 3/2002 |
| WO | WO 02/23525 | 3/2002 |
| WO | WO 02/25636 A2 | 3/2002 |
| WO | WO 02/25637 | 3/2002 |
| WO | WO 02/27708 A2 | 4/2002 |
| WO | WO 02/056199 A2 | 7/2002 |
| WO | WO 02/101720 A1 | 12/2002 |

OTHER PUBLICATIONS

T. Barry, "The Simultaneous Use of Three Machine Speech Recognition Systems to Increase Recognition Accuracy," Proceedings of the IEEE National Aerospace and Electronics Conference, New York, NY, (May 1994), pp. 667-671.

P. van Lieshout, "PRAAT Short Tutorial," Univ. of Toronto, Department of Speech-Language Pathology, Faculty of Medicine, V. 3.0, (Jan. 7, 2002), pp. 1-26.

S.H. Chung and D. Moldovan, "Speech Understanding on a Massively Parallel Computer," Proceedings of the International Conference on Spoken Language Processing, Edmonton, University of Alberta, CA, (Oct. 1992), pp. 1355-1358.

U.S. Appl. No. 10/430,438, filed on May 7, 2003, entitled "Method and System for the Processing of Voice Data and the Classification of Calls".

U.S. Appl. No. 10/430,436, filed on May 7, 2003, entitled "Method and System for the Processing of Voice Data by Means of Voice Recognition and Frequency Analysis".

U.S. Appl. No. 10/430,404, filed on May 7, 2003, entitled "Method and System for the Processing and Storing of Voice Information".

U.S. Appl. No. 10/430,439, filed on May 7, 2003, entitled "Method and System for the Processing of Voice Information".
U.S. Appl. No. 10/430,405, filed on May 7, 2003, entitled "Method and System for the Recognition of Voice Information".

P.J. Wyard et al., "Spoken Language Systems—Beyond Prompt and Response," BT Technol. J., vol. 14, No. 1, (Jan. 1996), pp. 187-205.

* cited by examiner

METHOD AND SYSTEM FOR THE PROCESSING OF VOICE DATA AND FOR THE RECOGNITION OF A LANGUAGE

FIELD OF THE INVENTION

The present invention relates to methods and systems for the automatic handling of voice data from a call between a first human party and one or more second human parties and/or an automated attendant system, or between a first human party and one or more second human parties, with the voice data being generated from the call.

BACKGROUND INFORMATION

Automatic voice recognition has been used in practice for some time and is used for the machine translation of spoken language into written text.

According to the space/time link between voice recording and voice processing, voice recognition systems can be divided into the following two categories:

"Online recognizers" are voice recognition systems that translate spoken comments directly into written text. This includes most office dictation machines; and "Offline recognition systems" execute time-delayed voice recognition for the recording of a dictation made by the user with a digital recording device, for example.

The state of the art voice processing systems known to date are not able to understand language contents, i.e., unlike human language comprehension, they cannot establish intelligent a priori hypotheses about what was said. Instead, the acoustic recognition process is supported with the use of text- or application-specific hypotheses. The following hypotheses or recognition modes have been widely used to date:

Dictation and/or vocabulary recognition uses a linking of domain-specific word statistics and vocabulary. Dictation and/or vocabulary recognition is used in office dictation systems;

Grammar recognition is based on an application-specific designed system of rules and integrates expected sentence construction plans with the use of variables; and Single word recognition and/or keyword spotting is used when voice data to support recognition are lacking and when particular or specific key words are anticipated within longer voice passages.

A voice recognition system for handling spoken information exchanged between a human party and an automated attendant system is known, for example, from the document "Spoken Language Systems—Beyond Prompt and Response" (BT Technol. J., Vol. 14, No. 1, January 1996). The document discloses a method and a system for interactive communication between a human party and an automated attendant system. The system has a voice recognition capability that converts a spoken comment into a single word or several words or phrases. Furthermore, there is a meaning extraction step, where a meaning is attributed to the recognized word order, with the call being forwarded by the automated attendant system to a next step based on said meaning. By means of a database search, additional information can be obtained for a recognized word. Based on the recognized and determined information, a response is generated, which is transformed into spoken language by means of a voice synthesizer and forwarded to the human party. If the human party communicates with the automated attendant system through a multi-modal system,(e.g., an Internet, personal computer with voice connection), it can be provided with information determined by the automated attendant system visually on the screen and/or acoustically through the microphone of the personal computer and/or headsets. For further details, reference is made to the aforementioned document and the secondary literature cited therein.

Despite this high degree of automation, such voice recognition systems are problematic especially with respect to the recognition of the voice information unless the voice recognition system was adjusted to the specific pronunciation of a person in the scope of a learning phase because pronunciation differs from person to person. Especially automated attendant systems, where one party requests information or provides information, are not yet practicable because of the high error rate during the voice recognition process and the various reactions of the individual parties. Thus, many applications still require the use of a second party rather than an automated attendant system to take the information provided by the first party or give out information. If the second party receives information, the information—regardless of form—usually must be recorded, written down, or entered into a computer.

Furthermore, it is often necessary to follow-up on such calls, for example, to reconstruct in the case of sales talks or contract negotiations what was said by whom and in what context. The follow-up from memory or from scribbled notes is often incomplete and it is difficult to reconstruct the timeline. Although recordings on voice recorders are possible, they are difficult to integrate into the current data processing landscape. Further, digital recordings of the acoustic data require a greater memory capacity.

These procedures not only require a high personnel effort, but they also time-consuming, thus making the call throughput as well as the follow-up less than optimal.

Another problem exists when a great number of calls are made and have to be found quickly and easily if they are stored in any form. For example, easy access to the call data is desired in particular for statistical purposes.

In addition, it would be advantageous if it were possible to identify a party automatically.

SUMMARY OF THE INVENTION

The present invention is therefore based on the problem to provide methods and systems where the call throughput is increased and, most of all, where it is possible to identify the other party.

In this context, the situation may also arise that one of the parties speaks a language the voice recognition system cannot recognize. In that case, it would be advantageous if the language spoken by the respective party could be recognized automatically.

Therefore, the present invention is also based on the problem to provide methods and systems to increase the call throughput and, primarily, to identify the language spoken by the other party.

In accordance with an embodiment of the invention, a method is provided for processing voice data from a call between a first human party and one or more second human parties and/or an automated attendant system, or between a first human party and one or more second human parties, wherein the voice data is generated from the call. The method comprises: recognizing the language of the first party automatically; and analyzing the voice data either fully or in part with an automated voice recognition system and converting the voice data into text.

Voice data in the sense of the present invention comprise data of an acoustical call, which can be generated and/or registered from the spoken comments with the help of, for example, a technical recording system (such as a microphone). An automated voice recognition system in the sense of the invention is a system that can convert such voice data from a spoken comment into text automatically. Text in the sense of the invention is furthermore interpreted such that it means orthographical and/or textual information, which, for example, can be represented as text on an output device such as a printer or screen or as text in the conventional sense, but which can also be stored, for example, as (binary) code on a digital storage medium.

In accordance with another embodiment of the invention, a system is provided for processing voice data. The system comprises: at least one electronic device for the recognition and extraction of voice data (e.g., a voice recognition system), which can be connected to one or a plurality of devices for the recording of voice data (e.g., an automated attendant system); and, one or a plurality of means for the representation and/or storage of recognized and/or extracted voice data, with the one or any plurality of means for the representation and/or storage being directly or indirectly connected to the recognition and extraction device.

"Direct" in this context means that the connection is established directly through, for example, a cable, a wire, etc. "Indirect" in this context means that the connection is established indirectly through, for example, wireless access to the Internet, a radio- or infrared-connection, etc.

According to yet another embodiment of the invention, a computer program is provided with program code means to execute all steps of any of the methods of the invention when the program is executed on a computer, as well as a computer program product that comprises a program of this type in a computer-readable storage medium, as well as a computer with a volatile or non-volatile memory where a program of this type is stored.

Preferred and other embodiments of the present invention will be apparent from the following description and accompanying drawings.

It is to be understood that both the foregoing general description and the following detailed description are exemplary and explanatory only, and should not be considered restrictive of the scope of the invention, as described. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this specification, illustrate various embodiments and aspects of the present invention. In the drawings.

DETAILED DESCRIPTION

Figure 1:
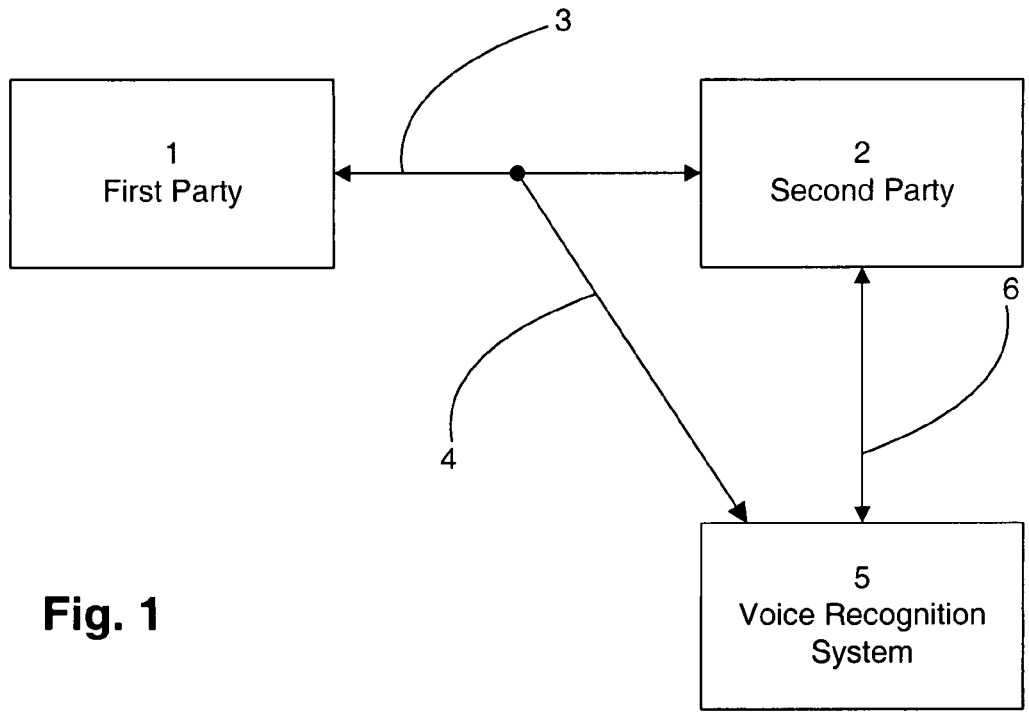
FIG. 1 is a schematic representation of a first configuration to execute a method, in accordance with an embodiment of the invention.

By way of example, the recognition of the language of a party may be executed as follows. The voice data are subjected to an online, i.e., if possible a near-time and/or a nearly synchronous, frequency analysis. This may be performed by means of known algorithms, for example, a Fourier transformation. The result is a frequency spectrum where a specific volume is attributed to a specific sonic frequency. Once characteristic features of such spectra, which are thus typical for a specific language, have been stored in advance, a comparison can be made between the spectra recorded online and the stored spectra, and when a match is found, the respective language can be attributed to the respective party and the voice recognition system can be set to the matched language, or the call can be forwarded automatically to a call center provided for the respective language. If the language cannot be clearly attributed because, for example, the recording of the voice data is poor or the speaker does not speak clearly, the result may provide several possible language matches. In such a case, a probability assessment can be performed such that the language for which the greatest number of matching characteristics is found during the comparison is considered the most probable match. The precision of the language recognition can be increased iteratively with the repeated recording of spectra at an appropriate call length and/or with appropriate frequent comments of the respective other party.

Another method for language recognition, consistent an embodiment of the invention, may be that a preset language of the voice recognition system is maintained for the time being while attempting to attribute words from the vocabulary resources of the language to the voice data and/or comments of the other party. If the number of recognized and attributed words is too low, i.e., if it is below a preset threshold, the vocabulary of one or a plurality of other languages is used as a basis. The language with the vocabulary that has the greatest word recognition and attribution is then selected as the most probable and further voice recognition is based on this language.

It is known that automated attendant systems can be used if the expected flow of information of a call is largely predetermined, i.e., if one party, for example, will give the automated attendant system an answer to a question such as yes or no, a number between one and five, etc. In that case, the voice recognition system can recognize the voice data with a high degree of success and the appropriate information can be stored for further processing.

For more complex calls, it was found in accordance with embodiments of the invention that instead of an automated attendant system, a second party is required to guarantee an exchange of information that is not distorted by error-prone voice recognition systems. To that end, however, the second party is provided with assistance to help with and/or avoid the tedious and time-consuming entering or recording of data. For that purpose, the voice data of the call between the first party and the second or any other party are forwarded to a voice recognition system. It is also conceivable that only the voice data of the first party are forwarded to the voice recognition system. The voice recognition system then executes the voice recognition for a subset of the voice data such as, for example, the voice data of only one party, and/or very generally for all voice data. Even if the voice recognition is only partially successful, the extracted information can be provided to a party. In this way, at least simple data such as numbers or brief answers to questions can be recognized by the voice recognition system without error and are then available to the party in a storable format.

However, for more complex calls, the call can be accepted first by an automated attendant system, which will forward the call to one party or to any second party or add the second party by switching. The call also can be established by the automated attendant system in that the system is set in such a way that it dials people based on a predefined list (such as a phone book) automatically by phone and then adds one or any second party by switching, or forwards the call to the second party. In this way, for example, simple opinion polls could be prepared automatically.

In one embodiment of the invention, the voice recognition system is preferably integrated into the automated attendant system.

If an automated attendant system is used, the automated attendant system may be implemented or work as an "Interactive Voice Response System" (IVRS). An IVRS system of this type is capable of communicating with a party—albeit within a limited scope—and reacting depending on the voice input from the party. Preferably, an automated IVRS system is provided to implement embodiments of the invention.

A high recognition rate can be achieved in an especially advantageous manner if the party whose voice data are to be analyzed is confronted with standard call structures. This could be declarations and/or questions by the automated attendant system and/or a party, which are already known to the voice recognition system in this form. The party confronted with the targeted questions and/or standard call structures will then most likely generally react "as anticipated", and the information contained in this expected reaction can be correctly recognized with a high degree of probability and extracted and/or stored accordingly. To that end, a method of grammar recognition could be used in a particularly advantageous manner for the voice recognition.

For the practical realization of an automated attendant system and/or a voice recognition system, at least one computer may be used. The same computer can be used for the automated attendant system and the voice recognition system. However, a preferred embodiment provides that only one computer is used as an automated attendant system. The voice data of the call are then forwarded to another computer, where the voice recognition system is implemented. This computer should have sufficient performance data or characteristics. In addition, a computer used as an automated attendant system may include an interface to establish a phone and/or video connection. Another interface can also be provided for the input and output of the voice and/or video data.

The voice recognition itself could be executed on one computer or a plurality of computers. Especially with time-sensitive applications, the voice recognition is preferably executed in parallel on a plurality of computers. Thus, the voice recognition process could be divided into a plurality of partial processes, for example, with each partial process being executed on a computer. In the division into partial processes, individual sentences or clauses could be assigned to each partial process, and a timed division of the voice data—for example into time intervals of 5 seconds each—is also conceivable. If the computer has a plurality of processors (CPUs), the partial processes could be distributed to the processors of the computer and executed in parallel.

If the computing performance of a single computer is not sufficient for the voice recognition and/or for the automated attendant system, a computer network system could be provided to execute these processes in parallel on a plurality of computers. In particular, individual computers of a network system could execute specific, varying voice recognition modes so that each computer analyzes the same voice data under a different aspect.

In the evaluation of voice data recorded by an automated attendant system, voice recognition could be tailored specifically to a request for analysis. For example, a poll of viewers or a quiz of listeners of a T.V. or radio show could be analyzed automatically so as to determine which political measures, for example, find the greatest acceptance among the viewers or listeners. The request for analysis, for example, could be to determine whether measure A or measure B is preferred, so that the information and the knowledge of the possible variants of the poll is taken into account in the voice recognition and/or provided to the voice recognition as additional information.

If the voice data comes from a call between two parties, the voice recognition may preferably be tailored specifically to a request for analysis. Such a request for analysis could comprise, for example, mainly the voice recognition of the voice data of one of the parties, with the analysis being tailored, for example, specifically to the recognition of the phone number of the one party, etc.

Methods provided for voice recognition include dictation, grammar, or single word identification and/or keyword spotting. This could include, for example, making a switch from one voice recognition method to the other voice recognition method depending on the current call situation if it is foreseeable that another voice recognition method promises better results for the voice recognition of the current call situation. Preferably, the various methods of voice recognition can also be employed in parallel, which is executed, for example, with parallel distribution to a plurality of computers.

In a preferred embodiment, repeated execution of the voice recognition is provided. To that end, it is possible to forward the voice data and/or the at least largely unchanged stored voice data of a call repeatedly to the same or different voice recognition processes. Repeated voice recognition may be implemented with an offline recognition system, because this allows a time delay of the voice recognition.

Another voice recognition strategy provides for performing a dynamic adjustment of the voice recognition. For example, the vocabulary for the voice recognition could be varied and/or adjusted. An initially employed voice recognition method—for example the dictation recognition—may result in a low recognition rate, making it obvious that maintaining the dictation recognition would only have a limited promise of success. It is then provided to dynamically employ another voice recognition method, with the recognition rate of the newly employed voice recognition method also being analyzed immediately, and another dynamic voice recognition step following thereafter, if necessary. It may also be provided to apply the same voice recognition method to the voice data in parallel on a plurality of computers, but using a different vocabulary for the voice recognition on each of the computers. An immediate analysis of the recognition rate of these parallel running voice recognition processes may lead to a dynamic adjustment and/or control of the further voice recognition.

In addition or alternately, another preferred procedure step is provided, which can be summarized under the preamble "vocabulary dynamization." This includes the repeated analyses of the voice data. In a first recognition step, the voice data are classified. This could be done using one or more of the keyword spotting methods, for example. Depending on the result of the voice data classification, the voice data are again analyzed in another recognition step after adding special vocabulary. This recognition process is based on a vocabulary that is directly or closely related to the result of the voice data classification step. It is entirely conceivable that the recognition step of the voice data is based on a vocabulary from a plurality of specific areas. The additional recognition step is preferably applied to the original voice data, but it is possible to include the information obtained in the first recognition step. Accordingly, the procedure steps of the vocabulary dynamization are applied over and over again to the original voice data.

In a preferred embodiment, the call is automatically forwarded to a call center provided for the respective language. During the forwarding or if no call center is available, the other party can be informed automatically with the help of language prompts, which are information sequences that are generated in advance or automatically. In another preferred embodiment, the recognition process of the language is running in the background.

In yet another preferred embodiment of the invention, the voice data are not only converted into textual information, but also subjected to a frequency analysis. The spectra obtained in this way can be recorded in near-time, i.e., online, and they can also be outputted on a display device such as a screen in near-time and thus made available to a party. It is preferred that particular time segments of the frequency analysis and/or particular spectra are attributed and/or stored for particular words of the recognized text. In the same way, particular spectra can be stored and attributed to the respective words. It is furthermore preferred to attribute known data of the caller to such spectra. By comparing the spectra of identical words from different calls, it can be determined whether the respective parties are identical. Accordingly, the identity of a caller who does not identify himself by name can be determined if a spectrum of a word said in the call is compared to an already established "file"—if the called party had already been identified before.

Another advantage of the frequency analysis is that the subjective mood of a called party can be recognized. This maybe performed such that the spectrum of a specific word is recorded and stored at different moods of the respective speaker. This can be performed, for example, in preliminary experiments or at a known mood of a known party. The comparison of the stored spectra and a spectrum of what is said currently then provides conclusions as to the current mood of the speaker. In particular, this can be of advantage in sales talks or contract negotiations, for one, if it is shown to the respective other party online, and also in the follow-up, when the call is analyzed retroactively based on the stored data (e.g., words and the related spectra).

In a further preferred embodiment, a specific action of an automated attendant system can be initiated automatically or as a function of program control when a specific mood of the other party is recognized. For example, a specific melody intended to improve the mood of the other party can be played if a bad mood of the other party is recognized. The recognized mood can furthermore be attributed to the call as a classification when the call is stored. This can be advantageous in the statistical analysis of a great number of calls.

In accordance with another preferred embodiment of the invention, the conversion of the voice data into text, i.e., into orthographic and/or textual information, is followed in another additional step by analyzing the obtained text for key words. Then the call is assigned a classification based on the recognized key words. These procedure steps can be implemented, for example, in that the text is searched for key words such as "error", "complaint", "return", etc. If one or more of these words are found, the call can be classified as "complaint", for example.

Key words and related classification can be stored in one or a plurality of tables and attributed to one another, for example in such a way that a column in a table named "complaint" includes all of the aforementioned key words in the lines below. However, the key words can also be stored in a file named with the respective classification. In a preferred embodiment, the classification is tailored to the purpose of the call. Examples are: Information, Complaint, Problem, Product X, etc. An expert may develop suitable key words for these classifications on his/her own. Suitable key words may also be determined easily based on experiments or on evaluations of already stored calls. In addition or alternately, the classification can also be tailored to the mood of the other party. If key words such as "crap" and "unacceptable" are mentioned in a complaint call about a delivery, the call can be assigned to the classification "irritated." The aforementioned examples are only suggestions. The user can easily compile their own word combinations tailored to the respective business purpose for his/her use. The classification is advantageously stored together with the text of the call. Alternately, it is also possible to link the stored call with the classification, which has also been stored.

Such classifications, for example, allow the statistical analysis of calls related to a specific Product X. This can help the manufacturer improve the quality of their products or better meet the demands of their customers.

In another preferred embodiment of the invention, the recognized text may be stored with an attributed timeline. This has the advantage that the recording of calls in a storage medium for data processing systems requires less memory as would be required if the call were to be recorded acoustically, for example, as a "wav-file." If a call were to be stored as a wav-file, approximately eight (8) megabytes of memory would be required per minute of call. If the call is converted into text in accordance with embodiments of the invention and then stored, only a few kilobytes are required for the same call.

The stored timeline of the call shows what was said at which time. This allows a better and more precise retroactive determination of the contents and the meaning of the individual call segments.

In a preferred embodiment, the recognized text can be attributed to the respective party. This can be done, for example, by analyzing the voices with the help of a frequency analysis, determining from the frequency analysis the characteristics for the respective party, and using the characteristics to attribute the spoken and recognized words to the respective party. In support or alternately thereto, an attribution can also be made using key words, such as names, for example.

In another preferred embodiment, the timeline of the recognized words can be displayed graphically on a screen. For example, the recognized words may be arranged on a time scale. If the number of words is too high to be represented in an orderly manner, only single key words, which may be defined in a table set up in advance, may be arranged on the time scale. The graphic representation may be implemented on a computer so that the complete text of a pre-selectable time segment is shown if single key words are selected. Especially for longer calls, this leads to significant timesaving. It can be done online or time-delayed. An online representation has the advantage that the respective (second) party can already obtain information about what has been said while the call is still in progress.

In embodiments of the invention, other recognition steps may be executed iteratively and will lead, in the ideal case, to a complete recognition of the entire voice data or at least a subset of the voice data. The further iterative recognition steps are preferably controlled by recognition probabilities, thus providing discontinuation criteria, for example, once the recognition probability no longer changes.

For security reasons, it goes without saying that the voice data of the call can be stored largely unchanged. The storing could comprise all voice data of the call. For example, if one party or the automated attendant system uses standard call structures that are known to the voice recognition system, only the voice data of the other party may be stored. Principally, it can be provided for the store process to store markers and/or bookmarks in addition to the voice data, thus providing the call to be stored with coherence or a logical subdivision. The subdivision could then accelerate or simplify the process of information extraction during subsequent voice recognition. Furthermore, it can be provided that information about the current call status is taken into account during the voice recognition. For example, during the beginning of the call, it could be taken into account that both parties will identify one another, so that voice recognition would use appropriate vocabulary and/or grammar recognition modes to that effect. This information about the current call status, regardless of how it was obtained, could also be stored together with the voice data.

In accordance with another preferred embodiment of the invention, it is provided that the voice recognition system and/or the voice recognition process is linked to a database system, such as R/3® (SAP Aktiengesellschaft, 69190 Walldorf, Germany) and/or an expert system. In this way, the results or the partial results of the voice recognition process can be entered directly into a database and/or an expert system. Furthermore, information from the database and/or expert system can be used to support the voice recognition process, for example for vocabulary dynamization. Thus, additional information can be extracted through the link, which—as already indicated—can be used for voice recognition.

The information obtained from the database and/or expert system can be used to control the dynamic recognition process of the voice recognition. For example, information about a party stored in a database and/or R/3® system can be used to control the voice recognition of the voice data available for the party such that the voice recognition is based on vocabulary that had already been used in earlier calls with the party. The voice data recognized during the current call can also be stored into the database and/or R/3® system or in an appropriate database and—already during the call—dynamically increase the vocabulary resource for the party during the voice recognition.

It is principally provided to store especially the information obtained in the voice recognition. In a preferred embodiment, it is additionally or alternately provided to provide information in the form of a graphical and/or orthographical representation. This may be provided for information that may be time-delayed and originated in a call recorded with an automated attendant system. This may also be applicable, however, to information from the voice recognition of call data that originated in a call between two or more parties. In this way, either all information concerning the call, i.e., literally every word, or only extracted and/or selected information from the call, which is useful for the respective application of methods in accordance with embodiments of the invention, may be displayed. The information may be provided on the output unit of a computer, such as a monitor, on a screen, or on a television. The output of information on a cell phone display may also be provided.

In general, information may be provided with time delay. This will be the case especially for call information that originated with an automated attendant system, i.e., where a synchronous voice recognition and/or information analysis is not necessary. Alternately, it is provided in a preferred manner to recognize the information nearly synchronously, i.e., "online" and/or provide it to the other party. This is the case in particular when voice data of a call between two parties are recognized and/or analyzed. The information can be provided either to one or both and/or all parties, depending on the objective of the application of methods in accordance with embodiments of the invention. Providing the information online, however, could also be effected in connection with an automated attendant system, for example, during a radio or T.V. show if a "live poll" must be analyzed within a short time.

The party to whom the information is provided during the call (the other party or any second party) could then at least partially direct, control and/or steer the voice recognition. For this purpose, appropriate symbols may be provided on the graphical user surface of a corresponding computer and/or control computer, which have varying effects on the voice recognition and can be operated simply and quickly by the called party. In particular, it may be provided that the called party can operate appropriate symbols that classify and/or select a plurality of results coming from the voice recognition system as correct or false. Finally, one of the parties can train the recognition system to the voice of the other party so that the voice recognition system can at least largely recognize the voice data of the other party during a longer call. Furthermore, appropriate symbols can be provided, which result in an acceptance or rejection of the information to be stored as a result of the voice recognition.

Furthermore, it may be provided, for example, that the called party uses standard vocabulary for the voice recognition or the sequence of the application of the various voice recognition methods.

When the voice recognition system is linked to a database and/or expert system, it may be provided that a user profile for each party has been established or has already been stored. The user profile could be loaded automatically for the recognition of another call to the same party. In addition, it is also conceivable that the party to whom the information is provided loads the user profile. For the recognition mode of the voice recognition, a specific vocabulary resource, etc. can be stored in a user profile.

In accordance with another preferred embodiment, information may be extracted from the database and/or expert system and provided in addition to the extracted voice information. This plan of action could be used, for example, in a call center. Here, the party accepting the call, referred to as agent in the following, is the party to whom the extracted information is provided. In addition to the recognized and extracted information from the voice recognition process, the agent may also be provided with additional information, for example, about the caller, his/her field of activity, etc., so that the agent receives, in an especially advantageous manner, more information even before the call ends than was in fact exchanged during the call. This also allows the-agent to address other subject areas that were not mentioned by the caller, thus giving the caller in an especially advantageous manner the feeling that the call center agent personally knows the caller and his/her field of activity. Proceeding in this way also allows providing the caller with a more intensive and/or effective consultation in an advantageous manner.

For the simple operation by a party, the appropriate output modules for the extracted information and/or the symbols for the control and/or steering of the voice recognition could be integrated into a total surface and/or in a total program of a computer program. In this way, a call center agent only needs to operate a central application and/or a central program, which also increases the efficiency of the total system.

In another advantageous manner, embodiments of the invention may be used for training call center agents. For example, the agent could be trained in call strategy specifically on the basis of the information stored about a caller in a database and/or expert system. An objective could be, for example, that on the one hand, the call center agent learns how to conduct a successful sales talk with a caller and on the other hand, that the agent supplies to the total system or stores in the total system important data about the caller—information that had either already been stored or is obtained during the call—so that a call center agent can also be trained in speed during the course of a call.

In an especially advantageous manner, the voice recognition system may be trained to the voice of a party. In the case of a call center, this would be the call center agent, who interacts with the voice recognition system practically at every call. Thus, at least the voice data of one of the parties, i.e., the agent, may be recognized and/or analyzed at an optimized recognition rate. The recognition rate of the voice recognition system can be furthermore increased in an advantageous manner in that one party and/or the call center agent repeats particular words that are important to the other party and/or the agent. Thus, the voice recognition system can then properly recognize and/or analyze these words said by the party to whom the voice recognition system is trained with a high recognition rate.

There are various possibilities to configure and develop embodiments of the present invention in an advantageous manner. Reference to that effect is made on the one hand to what is claimed and on the other hand to the following explanation of exemplary embodiments of the invention by reference to the accompanying drawings. Embodiments of the invention, however, are not limited to these examples.

FIG. 1 shows schematically a first party 1 and a second party 2, with both parties 1, 2 being involved in a call, in accordance with an embodiment of the invention. The phone connection between parties 1, 2 is indicated with the reference symbol 3. A connection 4 forwards voice data of the call to a voice recognition system 5.

In accordance with an embodiment of the invention, at least a subset of the voice data is recognized and extracted. The result of the voice recognition is provided to the party 2 through a connection 6. The connection 6 can also be a visual connection to a monitor, for example.

Figure 2:
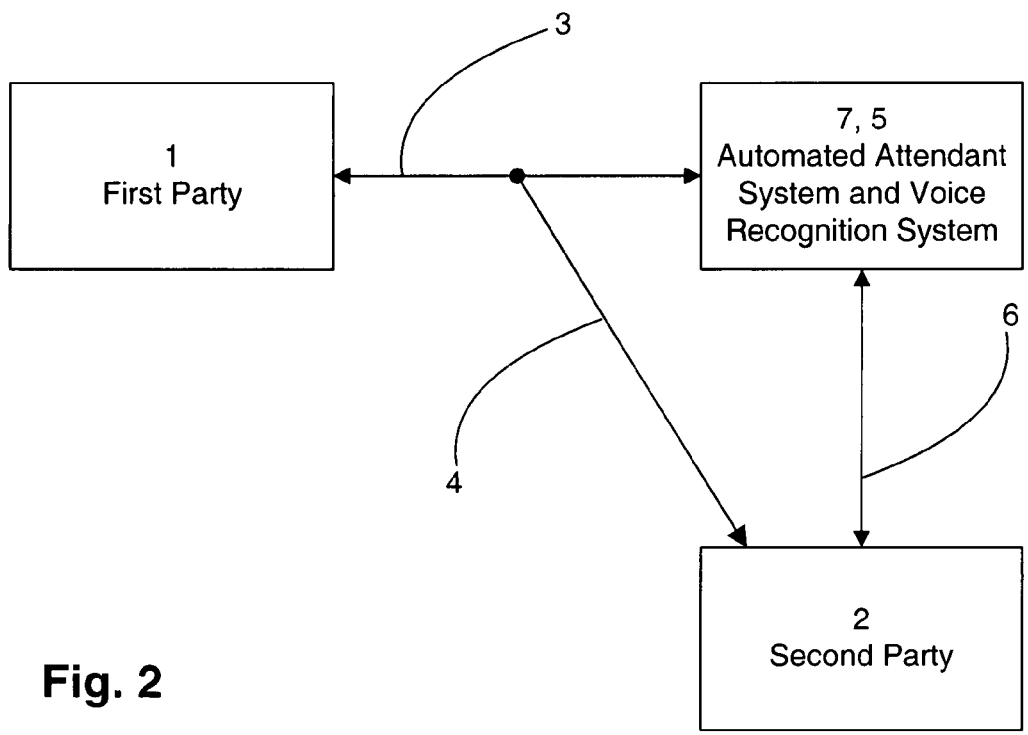
FIG. 2 is a schematic representation of a second configuration to execute a method, in accordance with another embodiment of the invention.

FIG. 2 shows a configuration, in accordance with another embodiment of the invention, where a party 1 is involved or was involved in a call with an automated attendant system 7 through a phone connection 3, and the automated attendant system 7 forwarded the call to a second party 2. The automated attendant system 7 may be implemented as an automatic interactive voice response system. A voice recognition system 5, which provides voice recognition as well as the storing of voice data and the extraction of information from the voice data, is also provided in or with the automated attendant system 7. By way of example, automated attendant system 7 may comprise a computer or workstation.

Figure 3:
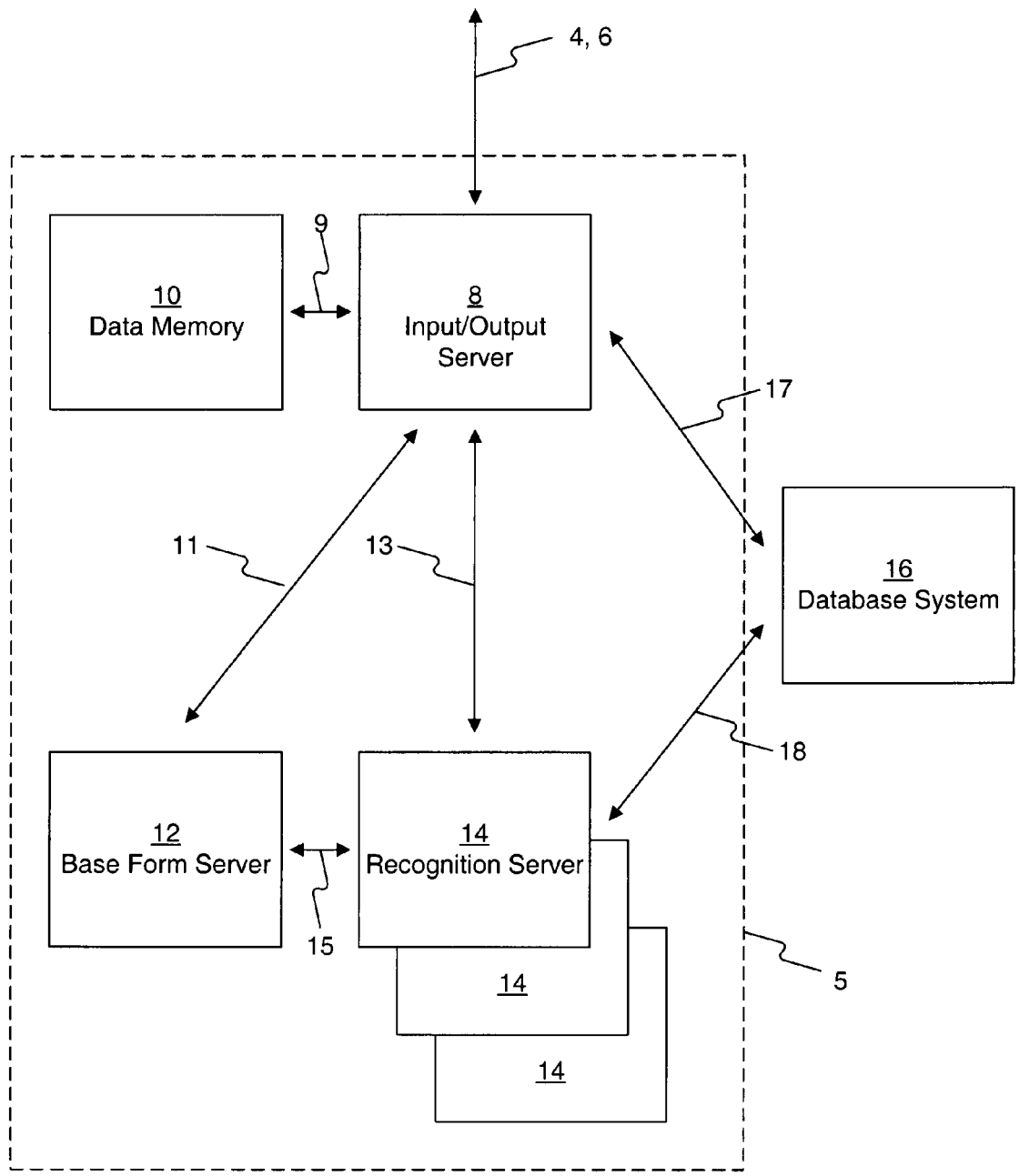
FIG. 3 a schematic representation of an exemplary voice recognition system, in accordance with an embodiment of the invention.

The voice recognition system 5 may be comprised of a plurality of computers, which is shown schematically in the example of FIG. 3. Specifically, it is a computer network system on which the voice recognition is executed in parallel. The voice data are forwarded through a connection 4 to the voice recognition system 5. The voice data are distributed over the network by an input/output server 8. In this way, the voice data are supplied through a connection 9 to a data memory 10. Furthermore, the voice data are supplied through connection 11 to a base form server 12 and through connection 13 to a plurality of recognition servers 14 (by way of example, three servers 14 are illustrated in FIG. 3). The base form server 12 provides the required phonetic pronunciation transcriptions. A voice data exchange between the base form server 12 and the three recognition servers 14 is also provided through the connection 15.

The voice recognition on the recognition servers 14 may be executed in parallel, e.g., one of the three recognition servers 14 executes a dictation recognition, the other recognition server 14 executes a grammar recognition and the third recognition server 14 executes a keyword spotting recognition. Accordingly, the three different voice recognition methods are employed quasi in parallel; because the various voice recognition methods require slightly different computing times, there is no synchronous paralleling in the strict sense.

If the voice recognition is executed repeatedly, the original voice data of the call, which were stored in the data memory 10, are requested by the input/output server 8 and again distributed to the base form server 12 and the recognition servers 14.

In an advantageous manner, the voice recognition system 5 as well as the voice recognition process may be linked to a database system 16 through the connections 17, 18. Through such link(s), additional information is extracted. The information about the party 1, which was stored in and is recalled from the database system 16, is used to support the voice recognition process. For this purpose, the recognition server 14 on which the dictation recognition is running is provided with a vocabulary that is stored in the database system 16 and was tied to the party 1 in the scope of a previous call.

Figure 4:
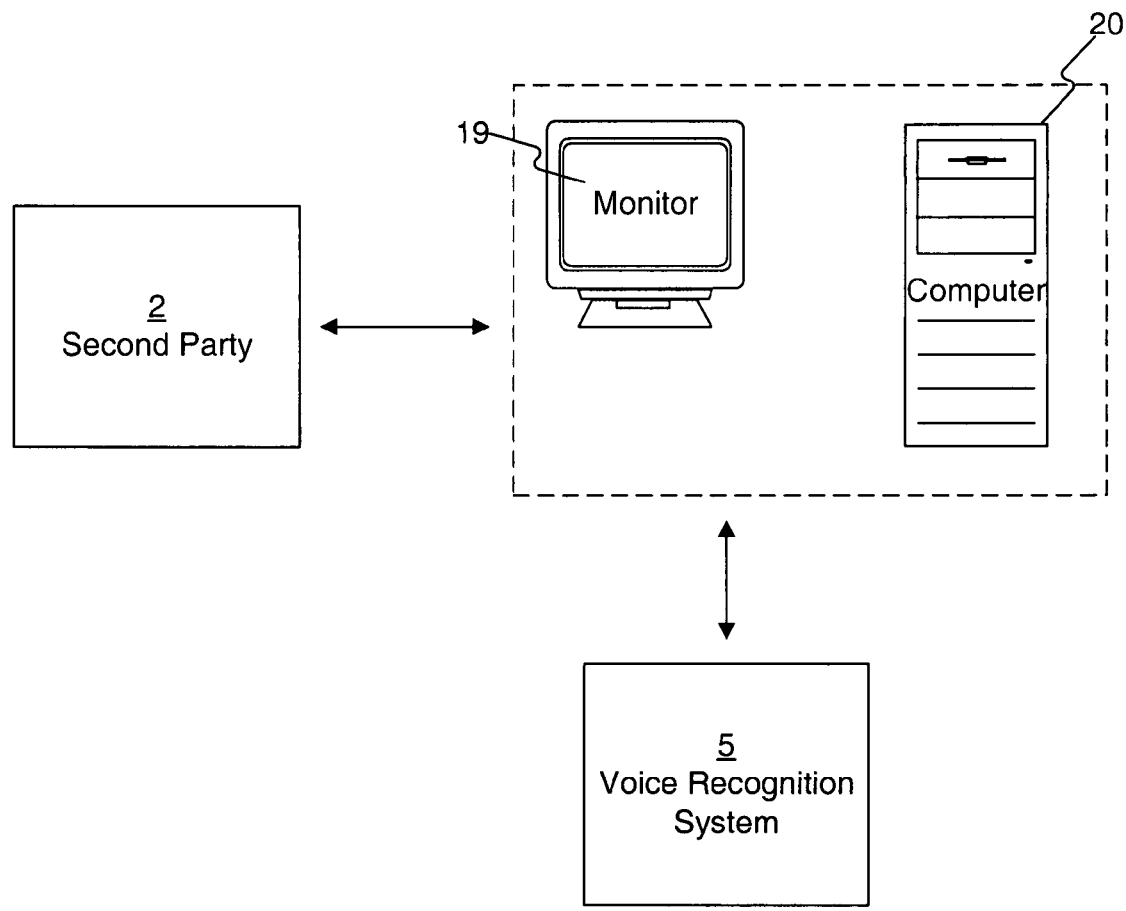
FIG. 4 a schematic representation of another configuration to execute a method, in accordance with an embodiment of the invention.

FIG. 4 shows schematically that party 2 may be provided with the information of the voice recognition system 5, including the information of the database system, in the form of a graphical and orthographical representation on a monitor 19 of a computer 20. The representation of the information may be effected during the call.

Party 2 can also interact in the voice recognition process through the computer 20 to control the voice recognition process such that an optimal voice recognition result can be obtained. The graphical as well as the orthographical representation of the extracted voice information as well as the control of the voice recognition process is executed with a user interface that is available to party 2 on the computer 20 including monitor 19. In this way, party 2, who is working for example as an agent in a call center, can provide the party 1 with an optimum consultation.

Other embodiments of the invention will be apparent to those skilled in the art from consideration of the specification and practice of the embodiments of the invention disclosed herein. In addition, the invention is not limited to the particulars of the embodiments disclosed herein. For example, the individual features of the disclosed embodiments may be combined or added to the features of other embodiments. In addition, the steps of the disclosed methods may be combined or modified without departing from the spirit of the invention claimed herein.

Accordingly, it is intended that the specification and embodiments disclosed herein be considered as exemplary only, with a true scope and spirit of the embodiments of the invention being indicated by the following claims.

What is claimed is:

1. A method for processing voice data from a call between a first human party and a second or more human parties and/or an automated attendant system, or between a first human party and one or more second human parties, wherein the voice data is generated from the call, the method comprising:

analyzing the voice data using a frequency analysis to produce a first frequency spectrum comprising a specific volume attributed to a specific sonic frequency;

comparing the first frequency spectrum with frequency spectra of different languages to find a match;

recognizing the language of the first party automatically when the match is found;

analyzing the voice data either fully or in part with an automated voice recognition system and converting the voice data into text; and forwarding the call automatically to a call center provided for the recognized language.

2. A method in accordance with claim 1, wherein recognizing the language of the first party is performed in the background during a call.

3. A method in accordance with claim 2, further comprising notifying the first party automatically with the help of language prompts during the forwarding of the call or when the call center is not available.

4. A method in accordance with claim 1, further comprising providing the text and a graphical representation of the results of the frequency analysis as output to a display device.

5. A method in accordance with claim 4, wherein providing the text and the results of the frequency analysis is executed online.

6. A method in accordance with claim 1, further comprising attributing particular words of the text to particular time segments of the frequency analysis.

7. A method in accordance with claim 6, further comprising storing at least one of the particular words and the attributed segments of the frequency analysis.

8. A method in accordance with claim 1, further comprising comparing a portion of the first, frequency spectrum related to a specific word within the voice data to with frequency spectra of the same word previously stored from another call, and determining the identity of a party based on the results of the comparison.

9. A method in accordance with claim 1, further comprising analyzing the obtained text automatically to recognize one or more key words and assigning the call a classification automatically based on the recognized key words.

10. A method in accordance with claim 9, further comprising storing the key words and the classification in one or more tables and attributing the key words to the classification.

11. A method in accordance with claim 9, wherein assigning a classification to the call comprises tailoring the classification to the purpose of the call.

12. A method in accordance with claim 9, wherein assigning a classification to the call comprises tailoring the classification to the mood of the first party.

13. A method in accordance with claim 9, further comprising providing the assigned classification of the call to at least one of the human parties of the call.

14. A method in accordance with claim 1, wherein the call is a phone call made by the first party to the second party.

15. A method in accordance with claim 14, further comprising accepting the phone call with an automated attendant system and forwarding the call with the automated attendant system to the second party.

16. A method in accordance with claim 1, further comprising automatically establishing, with an automated attendant system, a call connection to the first party.

17. A method in accordance with claim 1, further comprising recording a timeline of the call, assigning the obtained text to the timeline, and storing the obtained text with the timeline.

18. A method in accordance with claim 17, further comprising providing a graphical representation of the timeline and obtained text on a display device.

19. A method in accordance with claim 17, further comprising analyzing and presenting a graphical representation of the timeline and the obtained text online.

20. A method in accordance with claim 17, further comprising attributing particular words of the obtained text to particular segments of the timeline.

21. A method in accordance with claim 20, further comprising storing the particular words with the attributed segments.

22. A method in accordance with claim 1, further comprising attributing the obtained text to a respective party of the call.

23. A method in accordance with claim 1, further comprising attributing key words from a pre-established table to the obtained text.

24. A method in accordance with claim 1, wherein the automated attendant system comprises an automated interactive voice response system (IVRS).

25. A method in accordance with claim 1, further comprising providing the first party of the call with standard call structures.

26. A method in accordance with claim 1, further comprising providing at least one computer to be used for the automated attendant system or the voice recognition system.

27. A method in accordance with claim 1, further comprising performing voice recognition with a plurality of computers in parallel.

28. A method in accordance with claim 1, further comprising performing voice recognition using a multiple of processes on one computer in parallel.

29. A method in accordance with claim 1, further comprising performing voice recognition in a computer network system in parallel.

30. A method in accordance with claim 1, further comprising storing the voice data of a call in at least a largely unchanged state.

31. A method in accordance with claim 1, wherein analyzing the voice data comprises performing voice recognition with information about the current call status being taken into account.

32. A method in accordance with claim 1, wherein analyzing the voice data comprises performing voice recognition that is tailored individually to a request for analysis.

33. A method in accordance with claim 1, wherein analyzing the voice data comprises performing voice recognition with at least one of dictation recognition, grammar recognition, single word recognition and keyword spotting.

34. A method in accordance with claim 33, wherein dictation recognition, grammar recognition, single word recognition and keyword spotting are used in parallel.

35. A method in accordance with claim 33, wherein voice recognition is performed repeatedly.

36. A method in accordance with claim 33, wherein voice recognition is performed with dynamic adjustment.

37. A method in accordance with claim 36, wherein the vocabulary for performing voice recognition is varied and/or adjusted.

38. A method in accordance with claim 36, further comprising classifying the voice data with keyword spotting as part of a first recognition step for the dynamic adjustment of the voice recognition.

39. A method in accordance with claim 38, further comprising reexamining the voice data as part of an additional recognition step by adding specific vocabulary.

40. A method in accordance with claim 39, further comprising iteratively performing additional recognition steps that are controlled by recognition probabilities.

41. A method in accordance with claim 1, further comprising providing a link between the voice recognition system and at least one of a database system and an expert system.

42. A method in accordance with claim 41, further comprising extracting additional information by using the link.

43. A method in accordance with claim 42, wherein the additional information is extracted from at least one of the database system and expert system in order to dynamically control the voice recognition.

44. A method in accordance with claim 43, further comprising providing at least one of the result of analyzing the voice data and the additional information in a graphical and/or orthographical representation.

45. A method in accordance with claim 44, wherein at least one of the result of analyzing the voice data and the additional information is provided with time delay.

46. A method in accordance with claim 44, wherein at least one of the result of analyzing the voice data and the additional information is provided to the second party nearly synchronously.

47. A method in accordance with claim 46, wherein at least one of the result of analyzing the voice data and the additional information is provided to the second party during the call.

48. A method in accordance with claim 1, further comprising enabling the second party to at least partially control the voice recognition.

49. A method in accordance with claim 48, wherein enabling the second party comprises permitting the second party to load user profiles to facilitate voice recognition.

50. A method in accordance with claim 1, further comprising providing additional information from at least one of a database system and expert system to facilitate voice recognition.

51. A method in accordance with claim 1, further comprising storing the result of analyzing the call as text.

52. A method in accordance with claim 1, wherein the method is used in a call center.

53. A method in accordance with claim 1, further comprising integrating the method as part of a total program of a computer program.

54. A method in accordance with claim 1, further comprising integrating the method to train agents of a call center.

55. A method in accordance with claim 1, further comprising training the voice recognition system on the voice of at least one of the first party and the second party, wherein the second party is an agent of a call center.

56. A method in accordance with claim 55, further comprising increasing the recognition rate of the voice recognition system by having the agent repeat single words spoken by the first party, so that the voice recognition system can analyze the voice data of a trained voice.

57. A system for processing voice data from a call between a first human party and a second or more human parties and/or an automated attendant system, or between a first human party and one or more second human parties, wherein the voice data is generated from the call, the system comprising:

means for analyzing the voice data using a frequency analysis to produce a first frequency spectrum comprising a specific volume attributed to a specific sonic frequency;

means for comparing the first frequency spectrum with frequency spectra of different languages to find a match;

means for recognizing the language of the first party automatically when the match is found;

a voice recognition system for analyzing the voice data either fully or in part to recognize and extract text from the voice data, the voice recognition system being linkable with one or more devices to record the voice data;

means for representing the recognized and extracted text, wherein the means for representing is connected directly or indirectly with the voice recognition system; and means for forwarding the call automatically to a call center provided for the recognized language.

58. A system in accordance with claim 57, wherein the voice recognition system is connected with at least one automated attendant system.

59. A system in accordance with claim 58, wherein the voice recognition system is connected to a plurality of automated attendant systems.

60. A system in accordance with claim 58, wherein the at least one automated attendant system comprises a stationary or mobile phone.

61. A system in accordance with claim 58, wherein the at least one automated attendant system comprises an automated interactive voice response system (IVRS).

62. A system in accordance with claim 57, wherein the voice recognition system comprises one or a plurality of computers.

63. A system in accordance with claim 58, wherein the at least one automated attendant system comprises one or a plurality of computers.

64. A system in accordance with claim 62 or 63, wherein the plurality of computers are connected in the form of a network.

65. A system in accordance with claim 64, wherein the network comprises a client/server structure.

66. A computer program product with program code means that are stored on a computer-readable storage medium and suitable to execute a method in accordance with any one of claims 1, 2, 3, 4, 21 and 22-56 when executed on a computer.

* * * * *

UNITED STATES PATENT AND TRADEMARK OFFICE
CERTIFICATE OF CORRECTION

PATENT NO.         : 7,406,413 B2                                    Page 1 of 1
APPLICATION NO. : 10/430403
DATED              : July 29, 2008
INVENTOR(S)        : Nicolas Andre Geppert and Jürgen Sattler It is certified that error appears in the above-identified patent and that said Letters Patent is hereby corrected as shown below:

On the title page item (73), should read:

(A) Name of Assignee:          (B) Residence

SAP AG                     Walldorf, Germany

Signed and Sealed this

Twenty-fourth Day of November, 2009

David J. Kappos
*Director of the United States Patent and Trademark Office*